United States Patent
Gill

(10) Patent No.: US 7,408,749 B2
(45) Date of Patent: Aug. 5, 2008

(54) CPP GMR/TMR STRUCTURE PROVIDING HIGHER DR

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 579 days.

(21) Appl. No.: 10/924,101

(22) Filed: Aug. 23, 2004

(65) Prior Publication Data

US 2006/0039092 A1   Feb. 23, 2006

(51) Int. Cl.
*G11B 5/39* (2006.01)
*G11B 5/127* (2006.01)

(52) U.S. Cl. .................. 360/324.2; 360/324.12

(58) Field of Classification Search ............ 360/324.11, 360/324.12
See application file for complete search history.

(56) References Cited

U.S. PATENT DOCUMENTS

| | | | |
|---|---|---|---|
| 5,583,725 A * | 12/1996 | Coffey et al. .......... 360/324.11 |
| 6,108,177 A * | 8/2000 | Gill ..................... 360/324.12 |
| 6,301,088 B1 * | 10/2001 | Nakada ................. 360/324.11 |
| 6,600,184 B1 * | 7/2003 | Gill ..................... 257/295 |
| 6,788,501 B2 * | 9/2004 | Gill ..................... 360/324.11 |
| 7,220,498 B2 * | 5/2007 | Nagahama et al. ....... 428/811.1 |
| 2002/0024780 A1 * | 2/2002 | Mao et al. ............. 360/324.11 |
| 2002/0181165 A1 | 12/2002 | Gill ..................... 360/321 |
| 2003/0011943 A1 | 1/2003 | Webb et al. ............ 360/324.1 |
| 2003/0169542 A1 * | 9/2003 | Gill ..................... 360/324.2 |
| 2004/0057165 A1 | 3/2004 | Gill ..................... 360/324.11 |
| 2005/0005427 A1 * | 1/2005 | Lee et al. .............. 29/603.15 |
| 2005/0045580 A1 * | 3/2005 | Baer et al. ............. 216/22 |
| 2005/0057864 A1 * | 3/2005 | Cyrille et al. .......... 360/324.12 |
| 2005/0059170 A1 * | 3/2005 | Min et al. .............. 438/3 |
| 2005/0122828 A1 * | 6/2005 | Odagawa et al. ........ 365/232 |
| 2005/0174691 A1 * | 8/2005 | Gill et al. .............. 360/135 |
| 2006/0002164 A1 * | 1/2006 | Cyrille et al. .......... 365/50 |
| 2006/0012926 A1 * | 1/2006 | Parkin et al. ........... 360/324.2 |

* cited by examiner

*Primary Examiner*—Brian E Miller
(74) *Attorney, Agent, or Firm*—Zilka-Kotab, PC

(57) ABSTRACT

A current perpendicular to plane (CPP) sensor having FeN in their free and pinned layers. A tunnel junction sensor (TMR) according to the present invention can have a MgO barrier layer, and a CPP GMR sensor according to the present invention can have a Cr spacer layer.

9 Claims, 3 Drawing Sheets

CPP GMR/TMR STRUCTURE PROVIDING HIGHER DR

FIELD OF THE INVENTION

The present invention relates to current perpendicular to plane (CPP) magnetoresistive sensors having improved dr/R performance and more particularly to a magnetoresistive sensor having FeN free and pinned layers.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in Current perpendicular to plane (CPP) sensors, which are particularly suited to use in perpendicular recording systems, due to their ability to read signals from a high coercivity medium. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

On type of CPP sensor is a tunnel valve or tunnel junction magnetoresitive sensor (TMR). Such sensors have a magnetic free layer and a magnetic pinned layer similar to a GMR or spin valve. The tunnel valve, however, has a thin electrically insulating barrier layer sandwiched between the free and pinned layers rather than an electrically conductive spacer layer. To meet the demands for increased sensor performance, researchers have sought to develop TMR sensors having improved performance characteristics. A theoretical improvement has been reported by constructing a TMR sensor having an Fe free layer, an Fe pinned layer and a MgO barrier formed therebetween. Such a construction has been proposed by Wulfhekel et al. in Applied Physics Letters, vol. 78, no. 4, 22 Jan. 2002. In reality however, TMR sensors having such a construction have not exhibited the performance that has been expected. At least a portion of this less than desirable performance has been due to the formation of Fe oxides FeOx at the interface of the free layer and the barrier layer and at the interface of the pinned layer and the barrier layer. In addition, Fe has a strong positive magnetostriction, which is undesirable for use in a free layer in that it causes magnetic instability in the sensor.

Another form of CPP sensor is a CPP GRM sensor. Such sensors have magnetic free and pinned layers and a non-magnetic, electrically conductive spacer layer sandwiched there between, similar to the more common CIP sensors. Since the current flows through the very thin GMR layers in a direction perpendicular to the plane of the layers, it can be appreciated that the overall electrical resistance, or sheet resistance (R), is extremely low. Since the performance of the sensor is the change in resistance divided by the sheet resistance, one can appreciate that as the sheet resistance approaches 0, the change in resistance also approaches 0 and the performance of the sensor drops off accordingly. Therefore, such CPP GMR sensors have not seen widespread use in commercial data storage systems.

Therefore, there is a need for a practical CPP magnetoresistive sensor having exceptional magnetoresistive performance. More particularly, there is a need for a TMR sensor having a strong dr/R performance, and a need for a CPP GMR sensor having a desired amount of electrical resistance, especially in the region of the free layer, spacer layer and pinned layer, since it is resistance in this area that contributes to GMR.

SUMMARY OF THE INVENTION

The present invention provides a current perpendicular to plane (CPP) magnetoresistive sensor having free and pinned layers comprised of FeN with a very small amount of N. If constructed as a TMR sensor, the sensor can include FeN free and pinned layers and a MgO barrier layer. Preferably the free and pinned layers only include 1-5 atomic percent N. If constructed as a CPP GMR sensor, the sensor can include free and pinned layers comprising FeN with 1-5 atomic percent N, and a non-magnetic electrically conductive spacer layer sandwiched there between. The spacer layer is preferably Cr, but could also be some other material such as Cu.

In the TMR sensor, the presence of the small amount of N in the free and pinned layers virtually eliminates oxygen migration from the MgO layer into the free and pinned layers. This very advantageously prevents the performance of the TMR sensor by preventing the formation of oxides FeOx at the interfaces between the spacer layer and the free and pinned layers.

In a CPP GMR sensor, the presence of small amounts of N in the free and pinned layers advantageously increases the electrical resistance of the sensor by a desired amount in these regions. In fact the presence of only 1-5 atomic percent N in FeN increases the resistivity of the alloy by about 5 times over that of pure Fe. This increase in resistance greatly improves the dr/R performance of the sensor.

The presence of N in the free and pinned layers also makes the material magnetically softer, which is especially beneficial for use in the free layer, since it makes the sensor more responsive to the presence of a magnetic field.

Furthermore, the presence of N increases the magnetic moment of the material, which further improves performance of the sensor. The presence of N in the FeN alloy also advantageously decreases the magnetostriction of the material which improves the performance of the sensor by making the free layer more magnetically stable.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1:
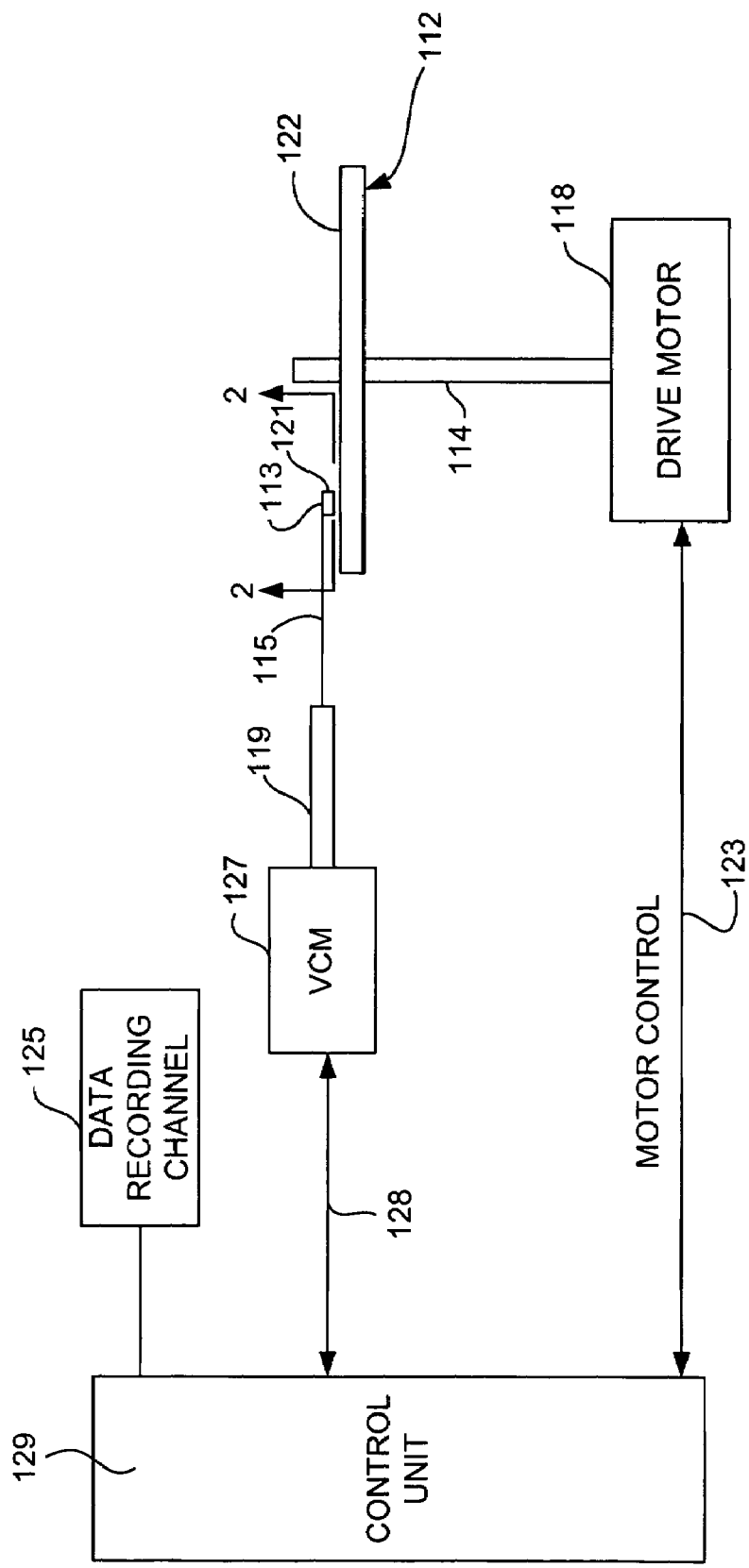
FIG. 1 is a schematic illustration of a disk drive system in which the invention might be embodied.

Referring now to FIG. 1, there is shown a disk drive 100 embodying this invention. As shown in FIG.1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115.

The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
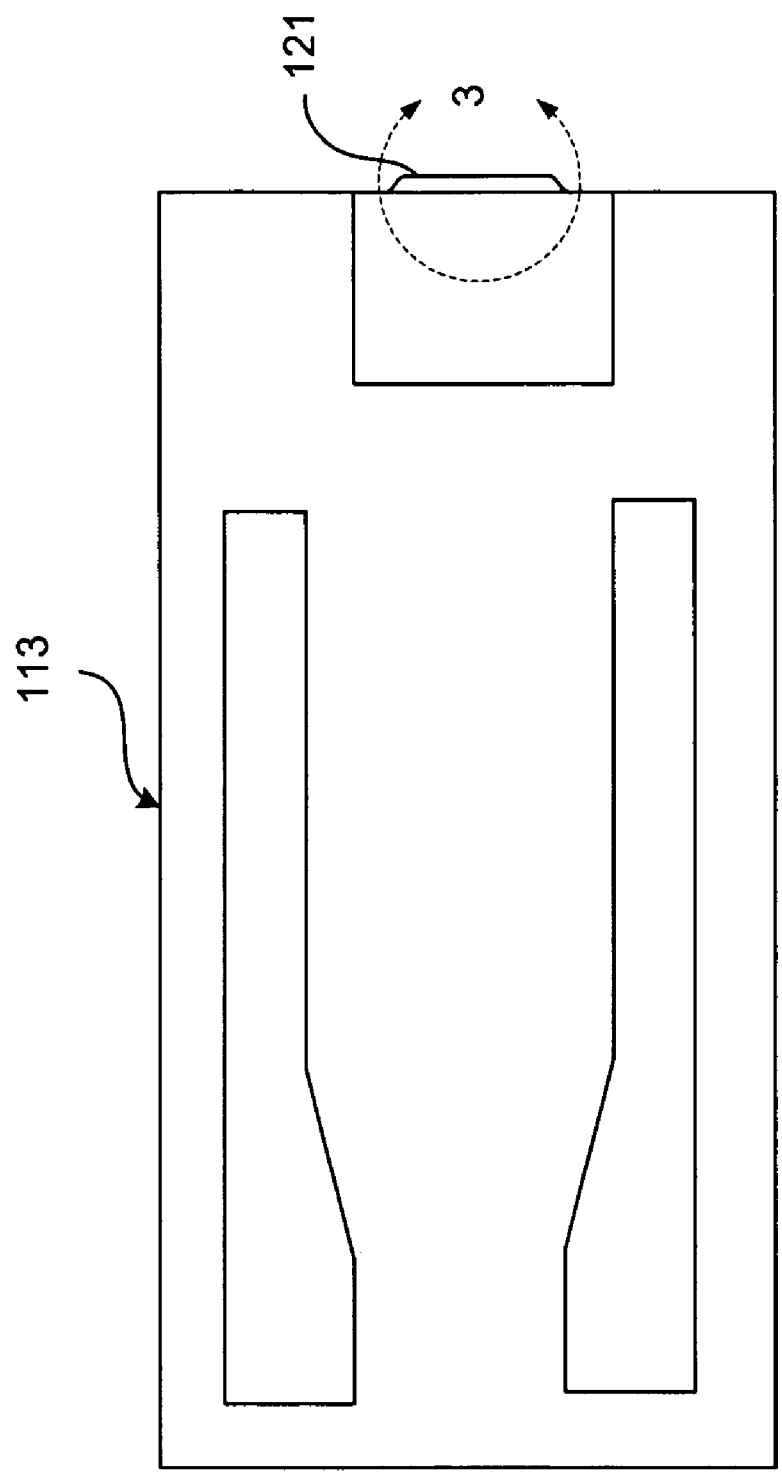
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
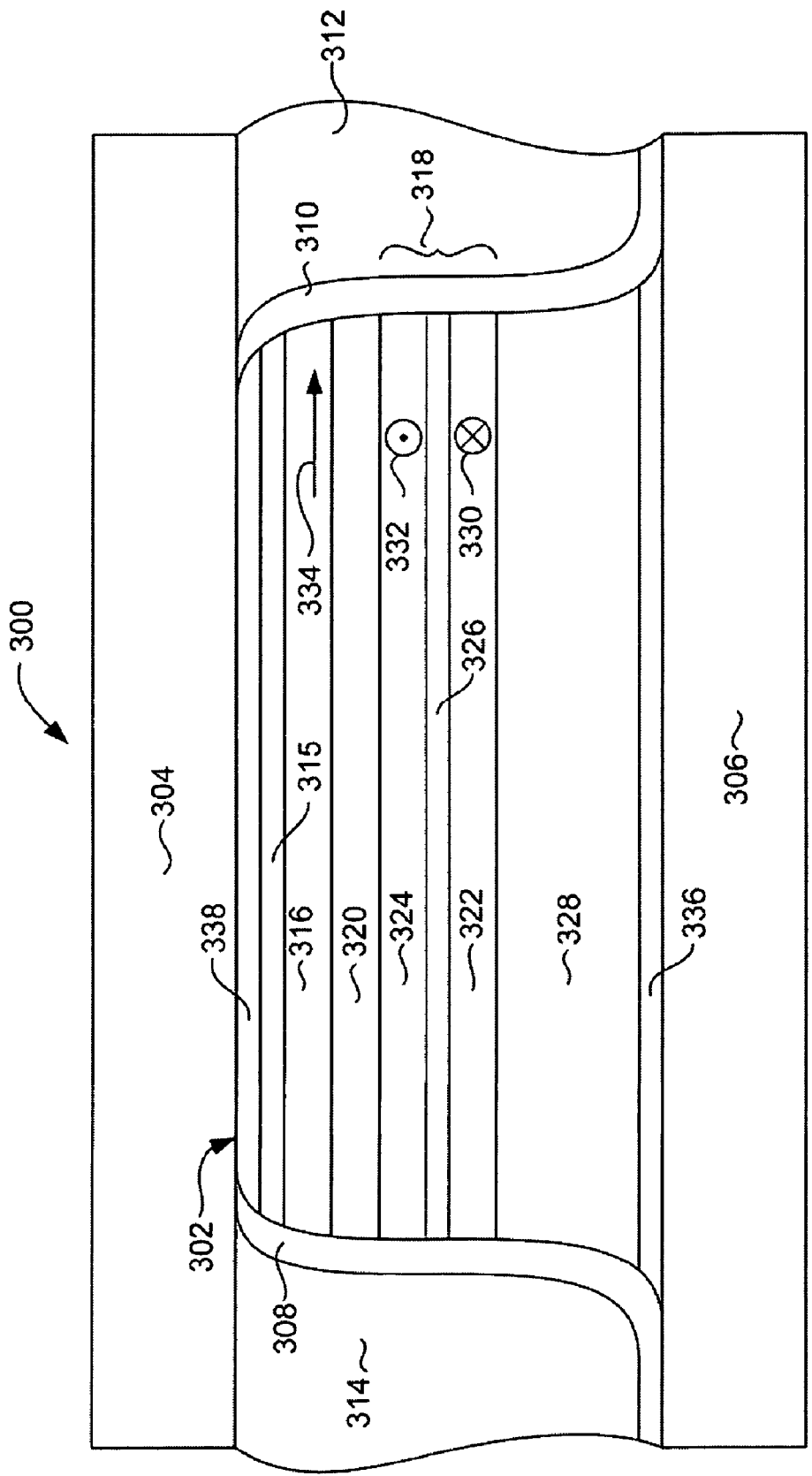
FIG. 3 is an ABS view of a magnetic sensor according to an embodiment of the present invention taken from circle 3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads. First and second insulation layers 308, 310 are formed at the sides of the sensor stack 302 and extend over at least one of the leads 304, 306. In addition, first and second hard magnetic bias layers 312, 314 are preferably provided at either side of the sensor to provide magnetic biasing for the free layer.

The sensor stack 302 includes a magnetic free layer 316 and a magnetic pinned layer structure 318, and a spacer/barrier layer 320 sandwiched there between. If the sensor 300 is a tunnel valve (TMR) then, the layer 320 is a non-magnetic, electrically insulating barrier layer 320 sandwiched between the free and pinned layers 316, 318. The barrier layer 320 preferably comprises MgO. On the other hand if the sensor 300 is a CPP GMR sensor then the layer 320 is a non-magnetic, electrically conductive spacer layer. The spacer layer can be constructed of many materials but is preferably constructed of Cr, although it could also be Cu.

The free layer 316 includes a layer of FeN, preferably having 1-5 atomic percent N. The free layer 316 may also have other layers, such as a layer of NiFe 315 disposed away from the spacer layer. However, if the free layer 316 does include other layers in addition to the FeN layer, the FeN layer is preferably disposed adjacent to the spacer/barrier layer 320.

Similarly, the pinned layer structure 318 includes a layer of FeN, 324 preferably having 1-5 atomic percent N disposed adjacent to the spacer barrier layer 320. The pinned layer structure may be one of many types of pinned layers, such as a self pinned, antiparallel (AP) coupled pinned layer, and AFM pinned structure, or a simple pinned structure having a single magnetic layer exchange coupled with a layer of antiferromagnetic material (AFM) layer.

As discussed above, the presence of a small amount of N in the free and pinned layers prevents the migration of oxygen into to free and pinned layers 316, 324. In the case where the sensor 300 is a TMR sensor having a MgO barrier layer 320, this advantageously prevents the formation of oxide layers in the boundary between the barrier layer 320 and the free and pinned layers 316, 318. As discussed above, the use of MgO in the barrier layer 320 has the potential to greatly increase the performance of the sensor. Therefore, the presence of N in the free and pinned layers 316, 318 allows the benefits of using a MgO barrier layer 320 while overcoming the oxygen migration problems discussed above, that would otherwise generate undesirable oxide layers at the interface between the barrier layer 320 and the free layer 316 and at the interface between the barrier layer 320 and the pinned layer 318.

The presence of N in the free and pinned layers 316, 324 also increases the electrical resistance of those layers which greatly increases the GMR of the sensor in the case that the sensor is a CPP GMR sensor having a non-magnetic, electrically conductive spacer layer 320.

The presence of the N in the free and pinned layers 316, 324 also increases the magnetic moment of the pinned and free layers 316, 318 which increases dr/R. The presence of N in the free and pinned layers 316, 318 also decreases the coercivity of the free layer 316 which improves sensor sensitivity, and reduces the magnetostriction of the free layer 316 which improves sensor stability. In order to further control the magnetostriction of the free layer 316, other alloying elements, such as Al or Ta among others, can be added to the free layer 316 as needed. Preferably the free layer 316 has a magnetostriction that is either zero or slightly negative.

Preferably, the pinned layer structure 318 includes first and second magnetic layers (AP1 and AP2) 322, 324 separated by and exchange coupled with a non-magnetic, electrically conductive antiparallel coupling layer (AP coupling layer) 326. As mentioned above, the second magnetic layer 324 preferably comprises FeN having 1-5 atomic percent N disposed adjacent to the spacer barrier layer 320. The first magnetic layer 322 preferably comprises Fe, although other materials or combinations of materials could be used as well. The AP coupling layer 326 could be constructed of many materials, such as Ru, but is preferably constructed of Cr. Cr exhibits good exchange coupling with both Fe and FeN, making it a good candidate for use in the present invention. The AP coupling layer 326 can be about 4 Angstroms thick to provide good antiparallel coupling of the first and second magnetic layers 322, 324. The first magnetic layer AP1 is preferably exchange coupled with a layer of antiferromagnetic material (AFM) 328.

This exchange coupling with the AFM layer 328 strongly pins the magnetic moment 330 of the AP1 layer 322 in a first direction perpendicular to the air bearing surface ABS. The strong antiparallel coupling of the AP1 and AP2 layers strongly sets the magnetic moment 332 of the AP2 layer 324 in a direction opposite that 330 of the AP1 layer 322. The free layer 316 has a magnetic moment 334 that is biased in a direction parallel to the ABS and perpendicular to the moments 330 332 of the pinned layer 318. The biasing for the moment 324 of the free layer 316 is from magnetostatic coupling with the hard bias layers 312, 314.

With continued reference to FIG. 3, the sensor stack 302 may include a seed layer 336, disposed at the bottom of the sensor stack 302. The seed layer promotes a desired crystalline growth in the subsequently deposited layers, providing improved sensor performance. The seed layer 336 can be constructed of for example, Fe, NiFe, NiFeCr or some other material or combination of materials. The sensor stack 302 can also include a capping layer 338, formed at the top of the sensor stack 302. The capping layer can be constructed of many materials, including Ta and serves to protect the other layers of the sensor stack 302 from damage during subsequent manufacturing processes such annealing.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A tunnel valve magnetoresistive sensor, comprising:
   a magnetic free layer comprising:
      a first layer comprising Fe, N and an alloying element selected from the group consisting of Al and Ta; and
      a second layer comprising NiFe;
   a magnetic pinned layer comprising FeN; and
   a non-magnetic barrier layer comprising MgO sandwiched between the free layer and the pinned layer; and
   wherein the first layer of the magnetic free layer is located adjacent to the non-magnetic barrier layer and the second layer of the magnetic free layer is located away from the non-magnetic barrier layer.

2. The tunnel valve as in claim 1 wherein the free layer comprises 1-5 atomic percent N.

3. The tunnel valve as in claim 1 wherein the pinned layer comprises 1-5 atomic percent N.

4. The tunnel valve as in claim 1 wherein the pinned layer and the free layer each comprise 1-5 atomic percent N.

5. The tunnel valve as in claim 1 wherein the pinned layer comprises:
   a first magnetic layer;
   a second magnetic layer comprising FeN and disposed adjacent to the barrier layer; and
   a non-magnetic, electrically conductive antiparallel coupling layer sandwiched between the first and second magnetic layers.

6. The tunnel valve as in claim 5 wherein the first magnetic layer comprises Fe.

7. The tunnel valve as in claim 5 wherein the non-magnetic coupling layer comprises Cr.

8. The tunnel valve as in claim 5 further comprising a layer of antiferromagnetic (AFM) material exchange coupled with the first magnetic layer.

9. A data recording system, comprising:
   a magnetic medium;
   a slider;
   an actuator connected with the slider for positioning the slider over a surface of the magnetic medium; and
   A tunnel valve magnetoresistive sensor connected with the slider and further:
      a magnetic free layer comprising:
      a first layer comprising FeN and an alloying element selected from the group consisting of Al and Ta; and
      a second layer comprising NiFe
      a magnetic pinned layer comprising FeN; and
      a non-magnetic barrier layer comprising MgO sandwiched between the free layer and the pinned layer; and
      wherein the first layer of the magnetic free layer is located adjacent to the non-magnetic barrier layer, and the second layer of the magnetic free layer is located away from the non-magnetic barrier layer.

* * * * *

UNITED STATES PATENT AND TRADEMARK OFFICE
CERTIFICATE OF CORRECTION

PATENT NO. : 7,408,749 B2
APPLICATION NO. : 10/924101
DATED : August 5, 2008
INVENTOR(S) : Gill Page 1 of 1

It is certified that error appears in the above-identified patent and that said Letters Patent is hereby corrected as shown below:

In column 2, line 65 "On type of CPP sensor" should read --One type of CCP sensor--;
In column 5, line 19 "anABS view of the slider" should read --an ABS view of the slider--.

In column 7, line 2, "manufacturing processes such annealing" should read --manufacturing processes such as annealing--

Signed and Sealed this

Twenty-first Day of July, 2009

JOHN DOLL
*Acting Director of the United States Patent and Trademark Office*